United States Patent
Gous et al.

(10) Patent No.: US 9,967,166 B2
(45) Date of Patent: May 8, 2018

(54) SOFT CONSTRAINED SHORTEST-PATH FIRST TUNNELING

(71) Applicant: Cisco Technology, Inc., San Jose, CA (US)

(72) Inventors: Alan Thornton Gous, Palo Alto, CA (US); Eleni Palkopoulou, Dallas, TX (US)

(73) Assignee: CISCO TECHNOLOGY, INC., San Jose, CA (US)

(*) Notice: Subject to any disclaimer, the term of this patent is extended or adjusted under 35 U.S.C. 154(b) by 94 days.

(21) Appl. No.: 15/048,192

(22) Filed: Feb. 19, 2016

(65) Prior Publication Data

US 2017/0005932 A1  Jan. 5, 2017

Related U.S. Application Data

(60) Provisional application No. 62/186,631, filed on Jun. 30, 2015.

(51) Int. Cl.
*H04L 12/26* (2006.01)
*H04L 12/729* (2013.01)

(52) U.S. Cl.
CPC ...... *H04L 43/0882* (2013.01); *H04L 43/0894* (2013.01); *H04L 45/125* (2013.01)

(58) Field of Classification Search
CPC ..... H04L 43/0882; H04L 47/10; H04L 45/04; H04L 45/00
See application file for complete search history.

(56) References Cited

U.S. PATENT DOCUMENTS

| | | | |
|---|---|---|---|
| 6,956,821 B2 * | 10/2005 | Szviatovszki | H04L 45/00 370/237 |
| 7,031,262 B2 | 4/2006 | Vasseur et al. | |
| 7,123,620 B1 | 10/2006 | Ma | |
| 7,215,644 B2 | 5/2007 | Wu et al. | |
| 7,599,298 B2 | 10/2009 | Marasli | |
| 7,599,349 B2 | 10/2009 | Vasseur et al. | |
| 7,643,425 B2 | 1/2010 | Yucel | |
| 7,995,461 B2 | 8/2011 | Vasseur et al. | |
| 8,014,291 B2 | 9/2011 | Vasseur et al. | |
| 8,477,629 B2 | 7/2013 | Vasseur et al. | |
| 8,773,992 B2 * | 7/2014 | Lai | H04L 45/04 370/230.1 |
| 2013/0212578 A1 * | 8/2013 | Garg | H04L 43/0882 718/1 |

* cited by examiner

*Primary Examiner* — Mohamed Kamara
(74) *Attorney, Agent, or Firm* — Ronald Fernando

(57) ABSTRACT

In one embodiment, a method includes obtaining a request to route traffic from a source to a destination in a network, where the request is associated with a setup bandwidth criterion. The method includes: identifying a plurality of candidate tunnel paths from the source to the destination; and, for each of the plurality of candidate tunnel paths, determining whether or not at least one of the candidate tunnel paths satisfies the setup bandwidth criterion. In response to determining that the plurality of candidate tunnel paths fail to satisfy the setup bandwidth criterion, the method includes: determining a congestion metric for each of a plurality of candidate tunnel paths from the source to the destination; and instantiating a tunnel from the source to the destination according to a candidate tunnel path with the lowest congestion metric.

20 Claims, 8 Drawing Sheets

| Link | Reserved BW | Reservable BW | BWOR |
|---|---|---|---|
| 204-A | 125 Gbps | 100 Gbps | 25% |
| 204-B | 250 Gbps | 200 Gbps | 25% |
| 204-C | 125 Gbps | 100 Gbps | 25% |
| 204-D | 150 Gbps | 100 Gbps | 50% |
| 204-E | 275 Gbps | 200 Gbps | 37.5% |
| 204-F | 250 Gbps | 200 Gbps | 25% |
| 204-G | 250 Gbps | 200 Gbps | 25% |

| Link | Reserved BW | Reservable BW | BWOR |
|---|---|---|---|
| 204-A | 125 Gbps | 100 Gbps | 25% |
| 204-B | 250 Gbps | 200 Gbps | 25% |
| 204-C | 125 Gbps | 100 Gbps | 25% |
| 204-D | 250 Gbps | 200 Gbps | 25% |
| 204-E | 500 Gbps | 400 Gbps | 25% |
| 204-F | 125 Gbps | 100 Gbps | 25% |
| 204-G | 150 Gbps | 100 Gbps | 50% |

| Link | Reserved BW | Reservable BW | BWOR |
|---|---|---|---|
| 204-A | 75 Gbps | 100 Gbps | ≤ 0% |
| 204-B | 175 Gbps | 200 Gbps | ≤ 0% |
| 204-C | 85 Gbps | 100 Gbps | ≤ 0% |
| 204-D | 185 Gbps | 200 Gbps | ≤ 0% |
| 204-E | 350 Gbps | 400 Gbps | ≤ 0% |
| 204-F | 50 Gbps | 100 Gbps | ≤ 0% |
| 204-G | 150 Gbps | 100 Gbps | 50% |

| Candidate Tunnel Path | AggBWOR |
|---|---|
| 1 | 0.75 |
| 2 | 1.375 |
| 3 | 1.125 |
| 4 | 1.0 |

SOFT CONSTRAINED SHORTEST-PATH FIRST TUNNELING

RELATED APPLICATION(S)

This application claims the benefit of U.S. Provisional Patent Application No. 62/186,631, filed on Jun. 30, 2015, the disclosure of which is hereby expressly incorporated by reference in its entirety.

TECHNICAL FIELD

The present disclosure generally relates to network routing, and in particular, to systems, methods, and devices enabling tunnel instantiation.

BACKGROUND

Resource reservation protocol—traffic engineering (RSVP-TE) uses an algorithm, for example, the constrained shortest-path first (CSPF) algorithm, to route (or signal) tunnels (e.g., label switch paths [LSPs]) within or through a network. CSPF requires that that a path be found through the network with sufficient reservable bandwidth along the entire path length in order to route a tunnel.

If it is not possible to find any path through the network through interfaces with enough available bandwidth for a tunnel, the tunnel will not be routed. Traffic that would use that tunnel to traverse the network needs to find another path, which in the simplest case will be the Internet protocol (IP) shortest path across the network. This path will be used irrespective of traffic on the path or resulting congestion. Furthermore, this path is typically the most congested.

This all-or-nothing approach leads to several problems. As a first example problem, traffic that would have routed over the tunnel now, typically, routes over the shortest interior gateway protocol (IGP) path, without regard for reservable bandwidth or current congestion conditions, which exacerbates the bandwidth shortage. Furthermore, the shortest IGP path is typically also the most congested in a network. As another example problem, other path constraints on the tunnel besides the bandwidth constraint, such as explicit hops, quality of service (QoS), and/or affinities settings, are ignored when the traffic goes unrouted. As a third example problem, the auto-bandwidth functionality, which is commonly used in some network systems, is unable to estimate future setup bandwidth values to request for the tunnel when the traffic goes unrouted. As such, with this example problem, if the tunnel is down or does not exist in the first instance, the auto-bandwidth measurements cannot be updated correctly (or at all).

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
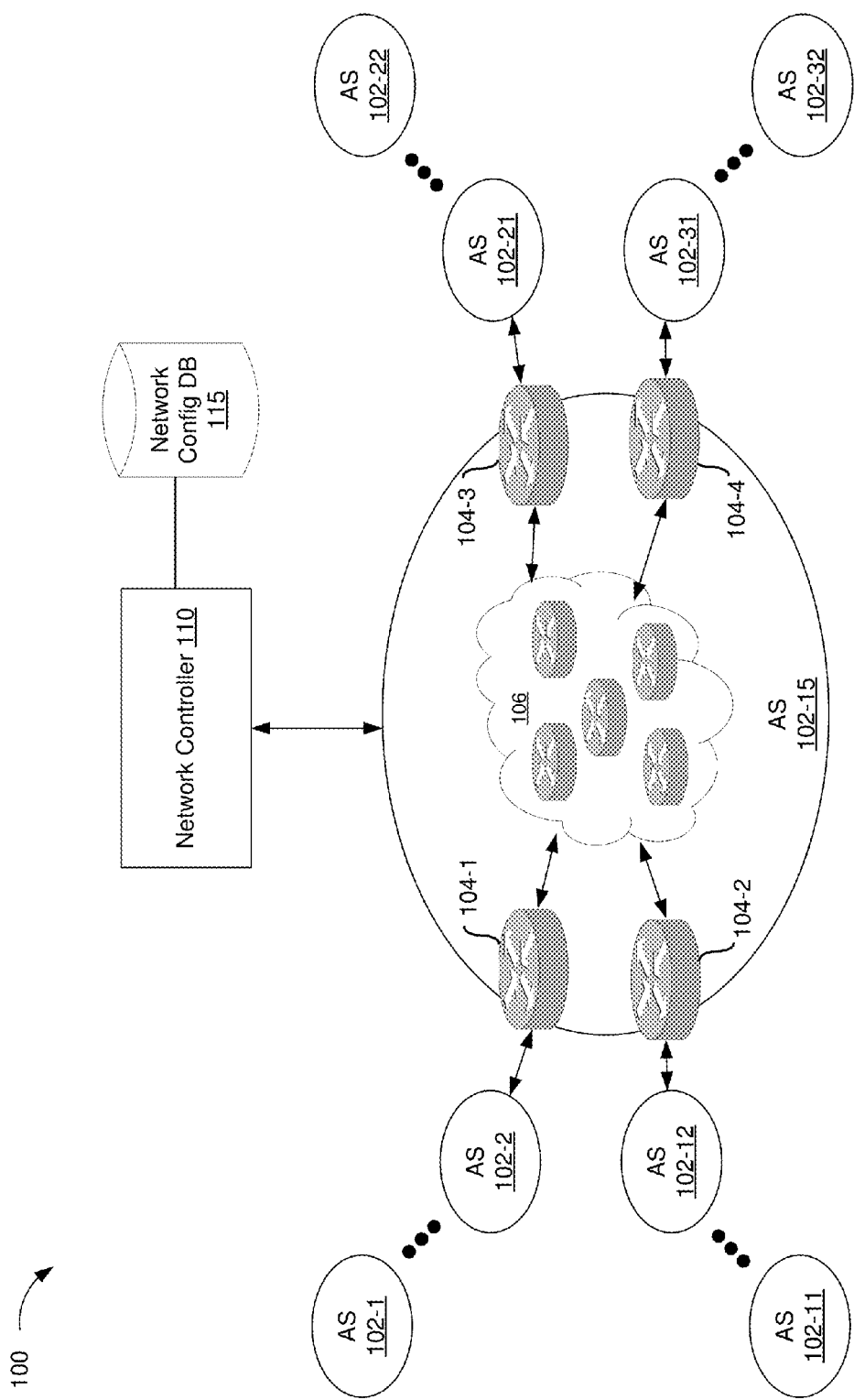
FIG. 1 is a block diagram of an example topology of a data network environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Various implementations disclosed herein include devices, systems, and methods for instantiating tunnels within a network. For example, in some implementations, a method includes obtaining a request to route traffic from a source to a destination in a network, where the request is associated with a setup bandwidth criterion. The method includes: identifying a plurality of candidate tunnel paths from the source to the destination; and, for each of the plurality of candidate tunnel paths, determining whether or not at least one of the candidate tunnel paths satisfies the setup bandwidth criterion. In response to determining that the plurality of candidate tunnel paths fail to satisfy the setup bandwidth criterion, the method includes: determining a congestion metric for each of a plurality of candidate tunnel paths from the source to the destination; and instantiating a tunnel from the source to the destination according to a candidate tunnel path with the lowest congestion metric.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

Example Embodiments

According to some implementations, the resource reservation protocol—traffic engineering (RSVP-TE) uses an algorithm, for example, the constrained shortest-path first (CSPF) algorithm, to route (or signal) new label switched paths (LSP's) (e.g., tunnels) in a multiprotocol label switching (MPLS) enabled network. Each interface is assigned a metric, or weight, and the tunnel is routed along the "shortest path" from its source to its destination, which is the path with the lowest sum of metrics or weights over the interfaces used. Interfaces that have available bandwidth less than the setup bandwidth of the LSP are excluded from consideration. Thus, the LSP is "constrained" on the shortest path constructed using interfaces with enough bandwidth.

If it is not possible to find any path through the network through interfaces with enough available bandwidth for the LSP, the LSP will not be routed. Traffic that would use that LSP to traverse the network needs to find another path, which in the simplest case will be the Internet protocol (IP) shortest path across the network. This path will be used irrespective of traffic on the path or resulting congestion. Furthermore, this path is typically the most congested.

This all-or-nothing approach leads to several problems. As a first example problem, traffic that would have routed over the tunnel now, typically, routes over the shortest interior gateway protocol (IGP) path, without regard for reservable bandwidth or current congestion conditions, which exacerbates the bandwidth shortage. Furthermore, the shortest IGP path is typically also the most congested in a network. As another example problem, other path constraints on the tunnel besides the bandwidth constraint, such as explicit hops, quality of service (QoS), and/or affinities settings, are ignored when the traffic goes unrouted. As a third example problem, the auto-bandwidth functionality, which is commonly used in some network systems, is unable to estimate future setup bandwidth values to request for the tunnel when the traffic goes unrouted. As such, with this example problem, if the tunnel is down or does not exist in the first instance, the auto-bandwidth measurements cannot be updated correctly (or at all).

According to some implementations, the soft-CSPF (SC-SPF) algorithm replaces (or, in some cases, extends) the CSPF algorithm and, in particular, treats the above situation, where there is not enough available bandwidth to find a route for the LSP, in a different way. In some implementations, instead of leaving the LSP unrouted, the SCSPF algorithm still establishes the LSP, but on a path that will cause the minimum amount of extra congestion to the network. According to some implementations, this is the path that passes through interfaces which in total are congested the least.

FIG. 1 is a block diagram of an example topology of a data network environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the data network environment 100 includes a plurality of autonomous systems 102, a network controller 110, and a network configuration database 115. In accordance with some implementations, an autonomous system (AS) refers to a group of routers within a network that are subject to common administration and a same interior gateway protocol (IGP) such as the open shorted path first (OSPF) protocol, the intermediate system to intermediate system (IS-IS) protocol, or the like. In some implementations, those of ordinary skill in the art will appreciate from the present disclosure that the data network environment 100 includes an arbitrary number of AS's.

As shown in FIG. 1, AS 102-15 (sometimes also herein referred to as the "customer network" or the "monitored network") includes a plurality of border routers 104-1, 104-2, 104-3, and 104-4 (sometimes also referred to as head-end routers) configured to connect the AS 102-15 with other AS's. For example, the border routers 104 communicate with AS's that are external to the AS 102-15 via an exterior gateway protocol (EGP) such as the border gateway protocol (BGP). The border routers 104 are also connected to a plurality of intra-AS routers 106 within the AS 102-15 (e.g., core routers). Intra-AS routers 106 broadly represent any element of network infrastructure that is configured to switch or forward data packets according to a routing or switching protocol. In some implementations, the intra-AS routers 106 comprise a router, switch, bridge, hub, gateway, etc. In some implementations, the intra-AS routers 106 form the core of the AS 102-15 and use a same routing protocol such as segment routing in an IPv6 data plane. In some implementations, those of ordinary skill in the art will appreciate from the present disclosure that the AS 102-15 includes an arbitrary number of border routers 104 and an arbitrary number of intra-AS routers 106.

In some implementations, the AS 102-15 operates according to MPLS. For example, MPLS is used to route at least some traffic through the AS 102-15 according to predetermined paths or tunnels (e.g., LSP's). In some implementations, when the AS 102-15 is subject to centralized control, the tunnel paths are determined and/or the tunnels are instantiated by the network controller 110. In some implementations, when the AS 102-15 is subject to distributed control, the tunnel paths are determined and/or the tunnels are instantiated by the border routers 104. In some implementations, the tunnels are instantiated (or signaled) using RSVP-TE. In some implementations, the tunnels are instantiated or signaled using the next steps in signaling (NSIS) protocol.

In some implementations, each of the border routers 104 maintains a link state database including some of: network topology, reservable bandwidth for nodes (e.g., the intra-AS routers 106) in the AS 102-15 (e.g., total bandwidth of the node), reserved bandwidth for nodes in the AS 102-15 (e.g., bandwidth that has already been reserved by one or more tunnels or the like), available bandwidth for nodes in the AS 102-15 (e.g., an indication of reserved bandwidth minus reservable bandwidth for a node), and the like.

In some implementations, the network controller maintains 110 a network configuration database 115 that stores internal information corresponding to the AS 102-15 (e.g., acquired via the simple network management protocol (SNMP), the network configuration (NETCONF) protocol, the command-line interface (CLI) protocol, or another protocol) and external information corresponding to external AS's (e.g., acquired via BGP or another protocol). In some implementations, the network controller 110 obtains the internal information from intra-AS routers 106 or from the link state databases of border routers 104. In some implementations, the network configuration database 115 includes node/link state information for nodes (e.g., the intra-AS routers 106) in the AS 102-15, interface names, IP addresses used by the interfaces and routers, routers names, network topology, and also statistical information such as traffic information, link metrics, historical congestion metrics, and the like. In some implementations, the network configuration database 115 also stores information related to the bandwidth consumption of nodes in the AS-102-15 such as reservable bandwidth for nodes in the AS 102-15 (e.g., total bandwidth of the node), reserved bandwidth for nodes in the AS 102-15 (e.g., bandwidth that has already been reserved by one or more tunnels or the like), available bandwidth for nodes in the AS 102-15 (e.g., an indication of reserved bandwidth minus reservable bandwidth for a node). In some implementations, the network configuration database 115 also stores information related to external AS's such as the topology of the external AS's connected to the AS 102-15 and IP addresses of at least some of the external AS's connected to the AS 102-15.

Figure 3:
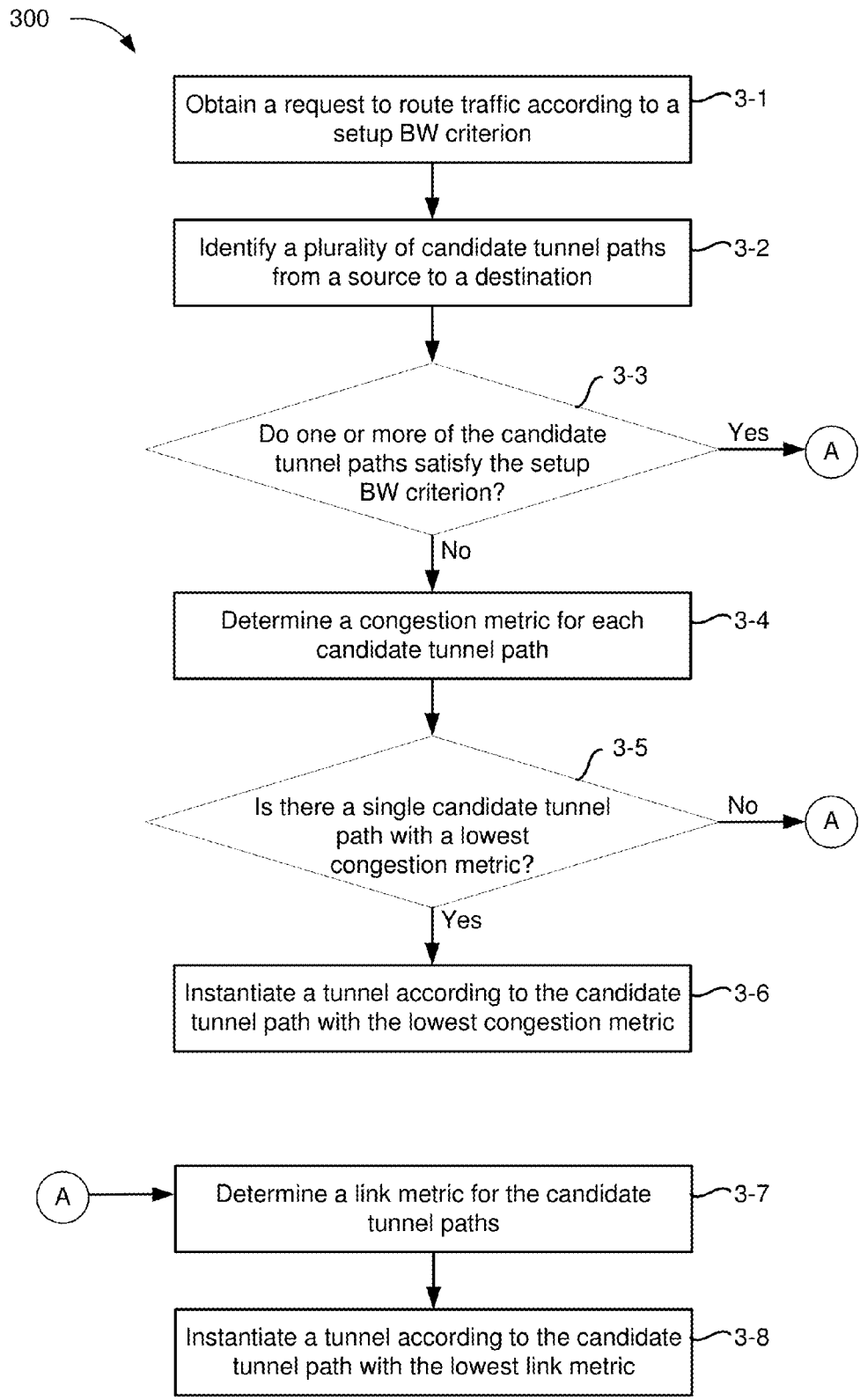
FIG. 3 is a flowchart representation of a method of in accordance with some implementations.

FIG. 3 is a flowchart representation of a method 300 of instantiating tunnels in accordance with some implementations. In various implementations, the method 300 is performed by a network controller (e.g., the network controller 110 in FIG. 1). In various other implementations, the method 300 is performed by a head-end router (e.g., one of the border routers 104 in FIG. 1). Briefly, in some circumstances, the method 300 includes: obtaining a request to route traffic according to a setup bandwidth criterion; identifying a plurality of candidate tunnel paths; determining one or more candidate tunnel paths satisfy the setup bandwidth criterion; if none of the plurality of candidate tunnel paths satisfy the setup bandwidth criterion, determining a congestion metric for each of the plurality of candidate tunnel paths; and, if a single candidate tunnel path has the lowest congestion metric, instantiating a tunnel according to the candidate tunnel path with the lowest congestion metric.

To that end, as represented by block 3-1, the method 300 includes obtaining a request to route traffic through a network according to a setup bandwidth criterion. In some implementations, a "setup bandwidth" is configured for each tunnel (e.g., LSP) in the network. This is the amount of bandwidth that RSVP-TE requests to be made available for each tunnel. Each node (e.g., a switch, router, or interface thereof) in the network is configured with a "reservable bandwidth" value, which is the total bandwidth that can be reserved on this node. Any existing tunnels routed through the network have their setup bandwidth subtracted from the reservable bandwidth for each node they traverse. This leaves an "available bandwidth" value, which is the amount of bandwidth that is free for new tunnels to use on each node.

Figure 2A:
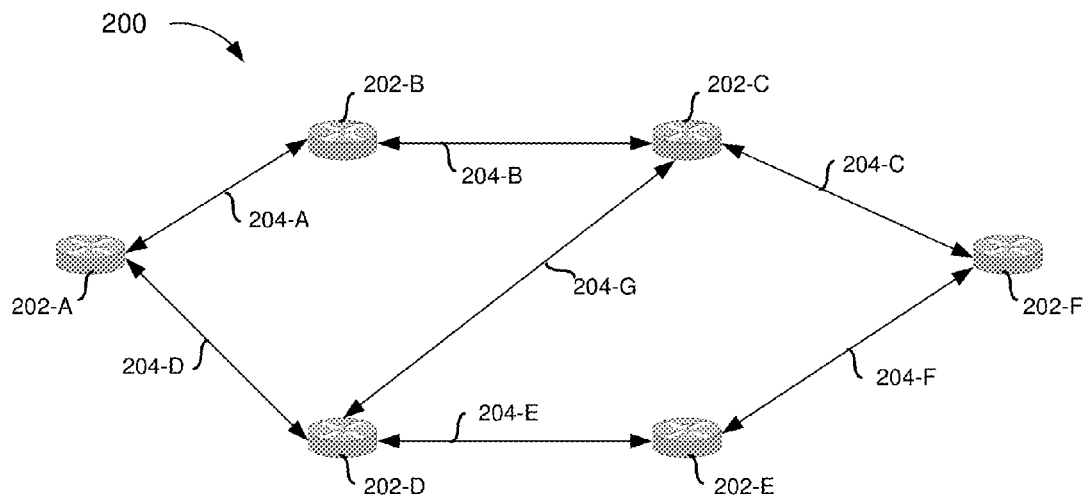
FIGS. 2A-2E illustrate block diagrams of example networks configurations in accordance with various implementations.
Figure 2B:
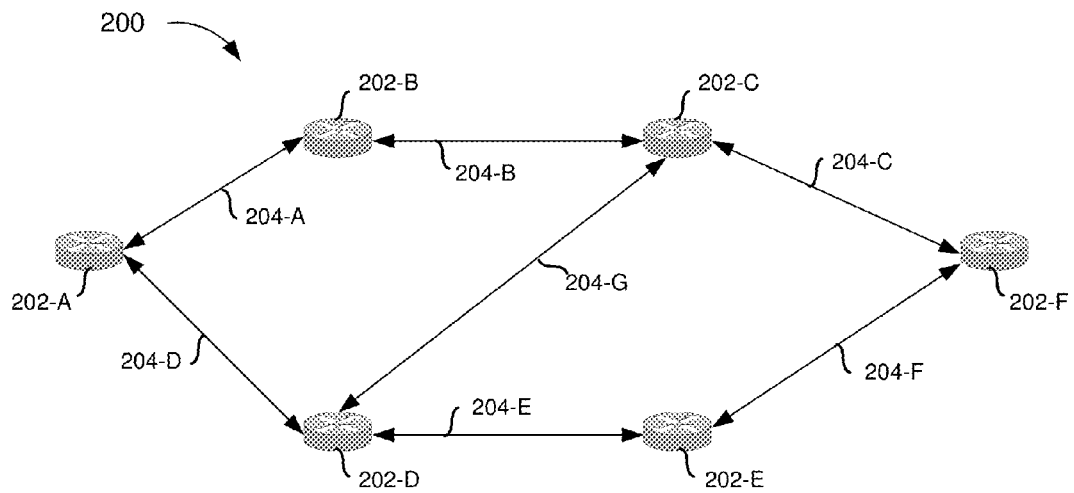
Figure 2C:
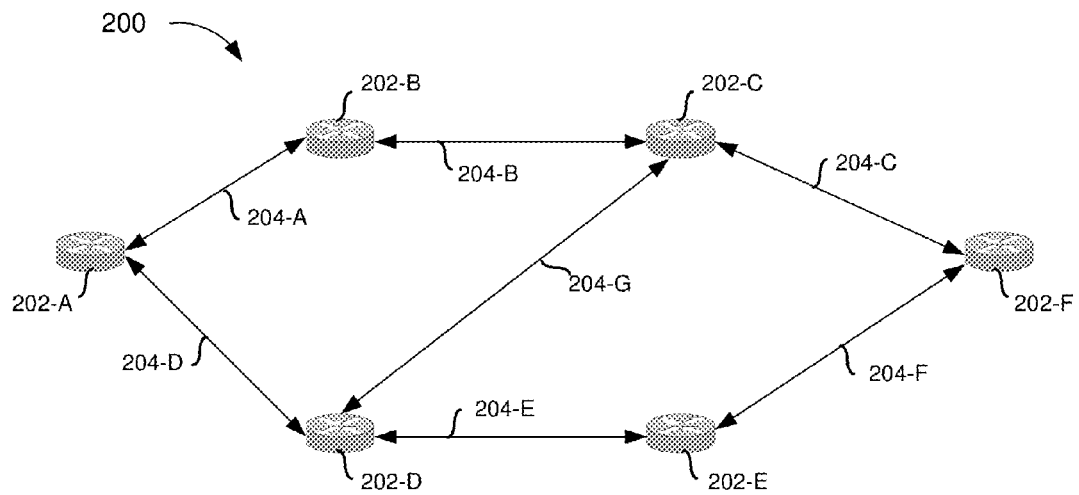

For example, with reference to FIGS. 2A-2C, a device (e.g., the network controller 110 in FIG. 1, or one of the border routers 104 in FIG. 1) obtains a request to route traffic through network 200. For example, the request is characterized by a source (e.g., the source node 202-A), a destination (e.g., the destination node 202-F), and a setup bandwidth (e.g., 25 Gbps [Giga-bits-per-second]). In another example, the source and destination are AS's that are external to the AS 102-15 in FIG. 1. As such, in this example, the source node 202-A is an ingress node (e.g., one of the border routers 104 in FIG. 1) into the network 200 (e.g., the AS 102-15 in FIG. 1), and the destination node 202-F is an egress node (e.g., one of the border routers 104 in FIG. 1) out of the network 200 (e.g., the AS 102-15 in FIG. 1).

In some implementations, the setup bandwidth criterion corresponds to an estimated traffic value for a new tunnel. For example, the estimated traffic value is a worst case traffic estimate. In some implementations, the setup bandwidth criterion corresponds to a real time traffic value for an existing tunnel. For example, when the device enables an auto bandwidth functionality, the device (e.g., the network controller 110 in FIG. 1, or one of the border routers 104 in FIG. 1) checks instantiated tunnels every X minutes (e.g., every 15 minutes) and re-routes a tunnel if a less congested path exists. In another example, when the device enables an auto-bandwidth functionality, the device (e.g., the network controller 110 in FIG. 1, or one of the border routers 104 in FIG. 1) checks instantiated tunnels every X minutes and re-routes a tunnel if the real-time bandwidth consumed by traffic flowing through the tunnel is different from the tunnel that was originally instantiated (e.g., less or greater than the original setup bandwidth within some tolerance such as +/−25%).

As represented by block 3-2, the method 300 includes identifying a plurality of candidate tunnel paths from a source to a destination through the network. For example, with reference to FIGS. 2A-2C, the device (e.g., the network controller 110 in FIG. 1, or one of the border routers 104 in FIG. 1) identifies a plurality of tunnel path candidates from source node 202-A to destination node 202-F including: candidate tunnel path 1 characterized by links 204-A, 204-B, and 204-C; candidate tunnel path 2 characterized by links 204-A, 204-B, 204-G, 204-E, and 204-F; candidate tunnel path 3 characterized by links 204-D, 204-E, and 204-F; and candidate tunnel path 4 characterized by links 204-D, 204-G, and 204-C.

As represented by block 3-3, the method 300 includes determining whether one or more of the plurality of candidate tunnel paths satisfy the setup bandwidth criterion. For example, a candidate tunnel path satisfies the setup bandwidth criteria if the nodes in the candidate tunnel path have sufficient available bandwidth to accommodate the setup bandwidth associated with the request. In some implementations, a candidate tunnel path fails to satisfy the setup bandwidth criterion if any of the nodes in the candidate tunnel paths has available bandwidth less than the setup bandwidth or within some tolerance thereof (e.g., 10% remaining available bandwidth or some remaining value in Mbps after considering the setup bandwidth). For example, with reference to FIGS. 2A-2C, the device (e.g., the network controller 110 in FIG. 1, or one of the border routers 104 in FIG. 1) determines whether the nodes in candidate tunnel paths 1, 2, 3, and 4 identified in block 3-2 have sufficient available bandwidth to accommodate the setup bandwidth criterion (e.g., 5 Gbps) associated with the request obtained in block 3-1.

For example, with reference to FIGS. 2A-2C, the bandwidth over reservation (BWOR) value (e.g., 25% for link 204-B in FIG. 2A) indicates a percentage of the bandwidth currently reserved by tunnels passing through a link (e.g., 250 Gbps for link 204-B in FIG. 2A) in relation to the total reservable bandwidth of the link (e.g., 200 Gbps for link 204-B in FIG. 2A). In other words, the BWOR is a measure of the congestion of a link. If a link has available bandwidth (e.g., defined by reservable bandwidth minus reserved bandwidth), the BWOR value for the link is less than 0%. On the other hand, if the link does not have available bandwidth (e.g., the link is over-reserved), the BWOR value for the link is greater than 0%. In some implementations, the setup bandwidth associated with the request is also added to the reserved bandwidth of the links when determining the BWOR values.

If none of the plurality of candidate tunnel paths satisfy the setup bandwidth criterion ("No" path from block 3-3), the method 300 continues to block 3-4. As such, all of the candidate tunnel paths have insufficient bandwidth, for example, due to strain on the network, a denial of service (DoS) attack, the failure of one or more nodes or links in the network, or the like.

In one example, as shown in table 210 in FIG. 2A, link 204-A has a BWOR value of 25%, link 204-B has a BWOR value of 25%, link 204-C has a BWOR value of 25%, link 204-D has a BWOR value of 50%, link 204-E has a BWOR value of 37.5%, link 204-F has a BWOR value of 25%, and link 204-G has a BWOR value of 25%. In another example, as shown in table 220 in FIG. 2B, link 204-A has a BWOR value of 25%, link 204-B has a BWOR value of 25%, link 204-C has a BWOR value of 25%, link 204-D has a BWOR value of 25%, link 204-E has a BWOR value of 25%, link 204-F has a BWOR value of 25%, and link 204-G has a BWOR value of 50%. Thus, candidate tunnel paths 1, 2, 3, and 4, in FIGS. 2A-2B, do not satisfy the setup bandwidth criterion because all of the links between source node 202-A and destination node 202-F have BWOR values greater than 0%.

If one or more of the plurality of candidate tunnel paths satisfy the setup bandwidth criterion ("Yes" path from block 3-3), the method 300 continues to block 3-7. In yet another example, as shown in table 230 of FIG. 2C, link 204-A has a BWOR value less than 0%, link 204-B has a BWOR value less than 0%, link 204-C has a BWOR value less than 0%, link 204-D has a BWOR value less than 0%, link 204-E has a BWOR value less than 0%, link 204-F has a BWOR value less than 0%, and link 204-G has a BWOR value of 50%. Thus, candidate tunnel paths 1 and 3, in FIG. 2C, satisfy the setup bandwidth criterion because all of the links between source node 202-A and destination node 202-F have BWOR values less than 0%.

As represented by block 3-4, the method 300 includes determining a congestion metric for each of the plurality of candidate tunnel paths. In some implementations, the congestion metric for a candidate tunnel path is a function of the bandwidth over reservation (BWOR) values for one or more links in the candidate tunnel path. For example, the congestion metric for a candidate tunnel path is a function of the sum of the BWOR values for links in the candidate tunnel path. In another example, the congestion metric for a candidate tunnel path is a function of the greatest BWOR value among the links in the candidate tunnel path. In yet another example, the congestion metric for a candidate tunnel path is a function of the average of BWOR values of one or more links in the candidate tunnel path. Those of ordinary skill in the art will appreciate from the present disclosure that the congestion metrics for the candidate tunnel paths are determined according to various other suitable ways in other embodiments.

In some implementations, the congestion metric for each candidate tunnel path is computed according to a modified Dijkstra algorithm. For example, with reference to FIGS. 2A-2B, each link 204 in the network 200 is assigned a distance value d, and each node 202 is assigned a distance value D. At each step in the algorithm there is a "combination" step and a "comparison" step. Each neighbor of the current node has a current value of D, and a potential new value, calculated by "combining" the value of D for the current node, with the d of the link between these two nodes. The "comparison" compares the current and potential new value of D for the neighbor node. If the new value is better, it replaces the current D.

According to the modified Dijkstra algorithm, d of a link is a tuple defined by (BWOR, m), where BWOR is the bandwidth over reservation value on the link, and m is the metric of the link. Furthermore, D of a node is a tuple defined by (AggBWOR, M), where AggBWOR is the current best estimate of the minimum BWOR log-sum along the path, and M is the current best estimate of the minimum metric sum. The combination operation is as follows:

$$(AggBWOR, M) + (BWOR, m) = (\log(e^{AggBWOR} + e^{BWOR}), M+m).$$

The comparison operator is as follows: $(AggBWOR_1, M_1)$ is preferred to $(AggBWOR_2, M_2)$, if $AggBWOR_1 < AggBWOR_2$. Or, if they are equal, $(AggBWOR_1, M_1)$ is preferred to $(AggBWOR_2, M_2)$, if $M_1 < M_2$.

According to some implementations, the advantage of this log method is that the system maintains and update two numbers. However, numerical errors may be associated with the log/exponent transformations of the log method. In some implementations, an alternative method is to maintain the entire list explicitly. According to some implementations, the advantage of this alternative is the exactness of the comparison, However, a potentially large list is maintained for this alternative method. In some implementations, another alternative method, also an approximation, is to maintain the first N entries of the list. In this case, only if two paths are equal in BWOR for all the first N entries, but not the entries after N, will the approximation give you the wrong result for the comparison.

Figure 2D:
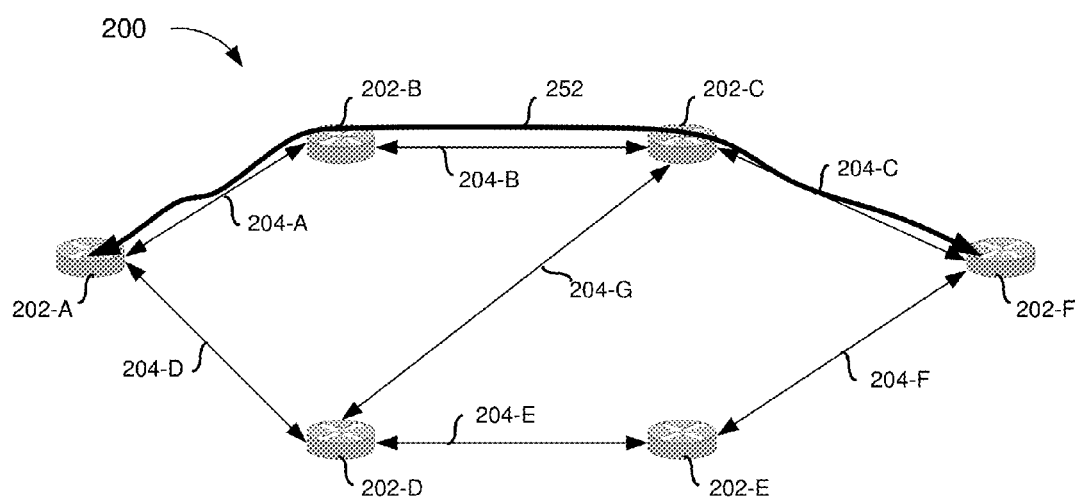

For example, table 250 in FIG. 2D shows AggBWOR values for candidate tunnels paths 1, 2, 3, and 4 based on the sum of BWOR values for links in each candidate tunnel path as shown in FIG. 2A. As shown in table 250 of FIG. 2D, the $AggBWOR_1$ for candidate tunnel path 1 characterized by links 204-A, 204-B, and 204-C is 0.75, the $AggBWOR_2$ for candidate tunnel path 2 characterized by links 204-A, 204-B, 204-G, 204-E, and 204-F is 1.375, the $AggBWOR_3$ for candidate tunnel path 3 characterized by links 204-D, 204-E, and 204-F is 1.125, and the $AggBWOR_4$ for candidate tunnel path 4 characterized by links 204-D, 204-G, and 204-C is 1.0. Thus, in this example, the candidate tunnel path 1, shown as path 252 in FIG. 2D, has the lowest congestion metric (e.g., 0.75).

Figure 2E:
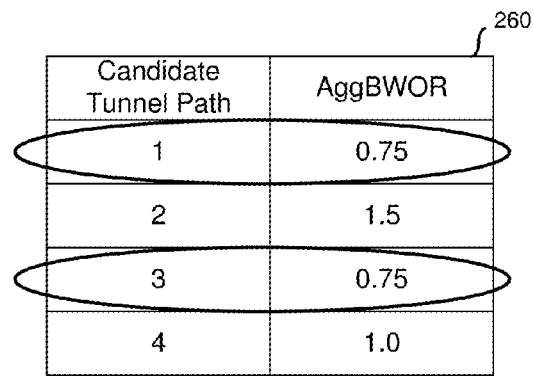
Figure 2E:
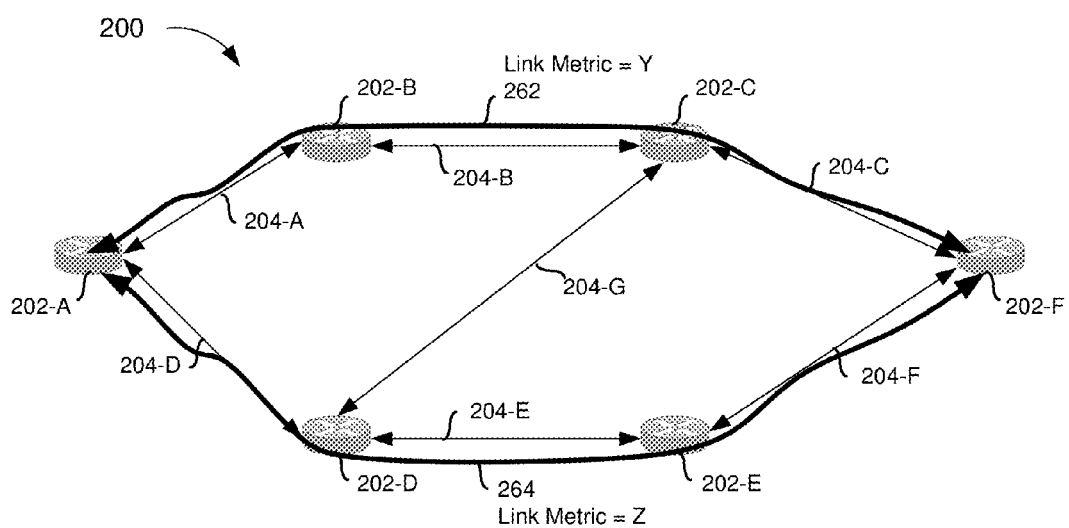

In another example, table 260 in FIG. 2E shows AggBWOR values for candidate tunnels paths 1, 2, 3, and 4 based on the sum of BWOR values for links in each candidate tunnel path as shown in FIG. 2B. As shown in table 260 of FIG. 2E, the $AggBWOR_1$ for candidate tunnel path 1 characterized by links 204-A, 204-B, and 204-C is 0.75, the $AggBWOR_2$ for candidate tunnel path 2 characterized by links 204-A, 204-B, 204-G, 204-E, and 204-F is 1.5, the $AggBWOR_3$ for candidate tunnel path 3 characterized by links 204-D, 204-E, and 204-F is 0.75, and the $AggBWOR_4$ for candidate tunnel path 4 characterized by links 204-D, 204-G, and 204-C is 1.0. Thus, in this example, the candidate tunnel path 1, shown as path 262 in FIG. 2E, and the candidate tunnel path 3, shown as path 264 in FIG. 2E, share the lowest congestion metric (e.g., 0.75).

As represented by block 3-5, the method 300 includes determining whether there is a single candidate tunnel path with the lowest congestion metric. If there is a single candidate tunnel path with the lowest congestion metric ("Yes" path from block 3-5), the method 300 continues to block 3-6. For example, with reference to FIGS. 2A and 2D, the candidate tunnel path 1 (shown as path 252 in FIG. 2D) characterized by links 204-A, 204-B, and 204-C has the lowest congestion metric (e.g., 0.75). If two or more candidate tunnel paths share the lowest congestion metric ("No" path from block 3-5), the method 300 continues to block 3-7. For example, with reference to FIGS. 2B and 2E, the candidate tunnel path 1 (shown as path 262 in FIG. 2E) characterized by links 204-A, 204-B, and 204-C and the candidate tunnel path 3 (shown as path 264 in FIG. 2E) characterized by links 204-D, 204-E, and 204-F share the lowest congestion metric (e.g., 0.75).

As represented by block 3-6, the method 300 includes instantiating a tunnel according to the candidate tunnel path with the lowest congestion metric. For example, with reference to FIGS. 2A and 2D, the device (e.g., the network controller 110 in FIG. 1, or one of the border routers 104 in FIG. 1) instantiates a tunnel (e.g., an LSP) according to candidate tunnel path 1 (shown as path 252 in FIG. 2D) characterized by links 204-A, 204-B, and 204-C. In some implementations, device (e.g., by network controller 110 in FIG. 1, or one of the border routers 104 in FIG. 1) routes the traffic associated with the request obtained in block 3-1 according to the tunnel instantiated in block 3-6.

As represented by block 3-7, the method 300 includes determining a link metric for each of the plurality of candidate tunnel paths. In some implementations, with reference to FIGS. 2A-2C, each of the links 204 is characterized by a link value which is a function of one or more factors. For example, with reference to FIGS. 2A-2C, the link value for link 204-B is a function of distance between node 202-B and node 202-C. For example, the link metric for a candidate tunnel path is the sum of the link values for links between nodes in the candidate tunnel path. In another example, the link metric for a candidate tunnel path is the average of the link values for links between nodes in the candidate tunnel path. Those of ordinary skill in the art will appreciate from the present disclosure that the link metrics for the candidate tunnel paths are determined according to various other suitable ways in other embodiments.

For example, with reference to FIGS. 2B and 2E, in response to determining in block 3-5 that the candidate tunnel path 1 (shown as path 262 in FIG. 2E) and the candidate tunnel path 3 (shown as path 264 in FIG. 2E) share the lowest congestion metric (e.g., 0.75), the device (e.g., the network controller 110 in FIG. 1, or one of the border routers 104 in FIG. 1) determines a link metric (e.g., Y) for the candidate tunnel path 1 characterized by links 204-A, 204-B, and 204-C and a link metric (e.g., Z) for the candidate tunnel path 3 characterized by links 204-D, 204-E, and 204-F.

In another example, with reference to FIG. 2C, in response to determining in block 3-3 that candidate tunnel paths 1 and 3 satisfy the setup bandwidth criterion, the device (e.g., the network controller 110 in FIG. 1, or one of the border routers 104 in FIG. 1) determines a link metric for candidate tunnel path 1 characterized by links 204-A, 204-B, and 204-C and a link metric for candidate tunnel path 3 characterized by links 204-D, 204-E, and 204-F.

As represented by block 3-8, the method 300 includes instantiating a tunnel according to the candidate tunnel path with the lowest link metric. For example, with reference to FIGS. 2B and 2C, the device (e.g., the network controller 110 in FIG. 1, or one of the border routers 104 in FIG. 1) instantiates a tunnel (e.g., an LSP) according to the candidate tunnel path with the lowest link metric. For example, with reference to FIG. 2E, if the link metric (e.g., with value Y) associated with the candidate tunnel path 1 (shown as path 262 in FIG. 2E) is less than the link metric (e.g., with value Z) associated with the candidate tunnel path 3 (shown as path 264 in FIG. 2E), a tunnel is instantiated along the path 262 characterized by links 204-A, 204-B, and 204-C. In another example, with reference to FIG. 2C, the device (e.g., the network controller 110 in FIG. 1, or one of the border routers 104 in FIG. 1) instantiates a tunnel (e.g., an LSP) according to the shortest candidate tunnel path among candidate tunnel paths 1 and 3. In yet another example, with reference to FIG. 2C, the device (e.g., the network controller 110 in FIG. 1, or one of the border routers 104 in FIG. 1) instantiates a tunnel (e.g., an LSP) based at least in part on the lengths and the link metrics of candidate tunnel paths 1 and 3. In some implementations, device (e.g., by network controller 110 in FIG. 1, or one of the border routers 104 in FIG. 1) routes the traffic associated with the request obtained in block 3-1 according to the tunnel instantiated in block 3-8.

As one example, $C_1$ is set of links along candidate tunnel path $P_1$ and $C_2$ is a set of links along candidate tunnel path $P_2$. If the BWOR values of the links in $C_1$ are $\leq 0$, select candidate tunnel path $P_1$. If the BWOR values of the links in $C_2$ are $\leq 0$, select candidate tunnel path $P_2$. If the BWOR values of all links in $C_1$ and $C_2$ are $\leq 0$, select candidate tunnel path $P_1$ or candidate tunnel path $P_2$ based on which path is shorter according to the sum of links metrics over the corresponding interfaces. If the BWOR values of all links in $C_1$ and $C_2$ are $>0$, set a first congestion metric $CM_1$ for candidate tunnel path $P_1$ as the highest BWOR value of the links in $C_1$, and set a congestion metric $CM_2$ for candidate tunnel path $P_2$ as the highest BWOR value of the links in $C_2$. If $CM_1 < CM_2$, select candidate tunnel path $P_1$. If $CM_2 < CM_1$, select candidate tunnel path $P_2$.

Continuing with this example, if $CM_1 = CM_2$, remove the $CM_1$ from $C_1$ and $CM_2$ from $C_2$, set the first congestion metric $CM_{1'}$ for candidate tunnel path $P_1$ as the next highest BWOR value of the links in $C_1$, and set a congestion metric $CM_{2'}$ for candidate tunnel path $P_2$ as the next highest BWOR value of the links in $C_2$. If $CM_{1'} < CM_{2'}$, select candidate tunnel path $P_1$. If $CM_{2'} < CM_{1'}$, select candidate tunnel path $P_2$. If $CM_{1'} \leq 0$ and $CM_{2'} \leq 0$, select candidate tunnel path $P_1$ or candidate tunnel path $P_2$ based on which path is shorter according to the sum of links metrics over the corresponding interfaces. If $CM_{1'} = CM_{2'}$, remove the $CM_{1'}$ from $C_1$ and $CM_{2'}$ from $C_2$, and repeat the above comparison step.

In other words, an approximation of this algorithm for each candidate tunnel path is defined by $AggBWOR \approx \log(\Sigma_{i \in P} e^{(BWOR*e^i)})$. To that end, candidate tunnel path A is preferred to candidate tunnel path B if the AggBWOR of path A is less than the AggBWOR of path B or, if they are equal, then the shorter path is preferred.

Figure 4:
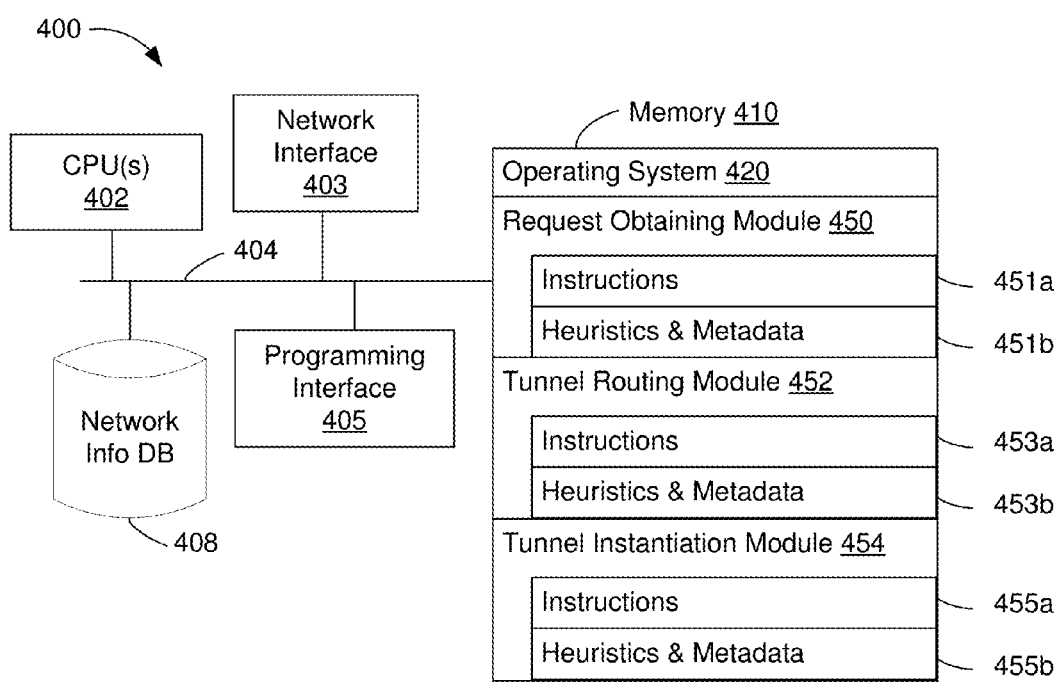
FIG. 4 is a block diagram of an example of a device in accordance with some implementations.

FIG. 4 is a block diagram of an example of a device 400 in accordance with some implementations. For example, in some implementations, the device 400 is similar to and adapted from the network controller 110 in FIG. 1. In another example, in some implementations, the network controller 400 is similar to and adapted from one of the border routers 104 in FIG. 1. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 400 includes one or more processing units (CPU's) 402, a network interface 403, a memory 410, a programming (I/O) interface 405, a network information database 408, and one or more communication buses 404 for interconnecting these and various other components.

In some implementations, the one or more communication buses 404 include circuitry that interconnects and controls communications between system components. The network information database 408 stores internal information related to a network (e.g., the AS 102-15 in FIG. 1) that is monitored by the device 400 and external information related to other external networks that are connected to said network. For example, in some implementations, network information database 408 is similar to and adapted from network configuration database 115 in FIG. 1. In another example, in some implementations, network information database 408 is similar to and adapted the link state database stored by one of the borders 104 in FIG. 1.

The memory 410 includes high-speed random access memory, such as DRAM, SRAM, DDR RAM, or other random access solid state memory devices. In some implementations, the memory 410 includes non-volatile memory, such as one or more magnetic disk storage devices, optical disk storage devices, flash memory devices, or other non-volatile solid state storage devices. The memory 410 optionally includes one or more storage devices remotely located from the one or more CPUs 402. The memory 410 comprises a non-transitory computer readable storage medium. In some implementations, the memory 410 or the non-transitory computer readable storage medium of the memory 410 stores the following programs, modules and data structures, or a subset thereof including an optional operating system 420, a request obtaining module 450, a tunnel routing module 452, and a tunnel instantiation module 454.

The operating system 420 includes procedures for handling various basic system services and for performing hardware dependent tasks.

In some implementations, the request obtaining module 450 is configured to obtain a request to route traffic through a network from a source to a destination according to a specified setup bandwidth criterion. To that end, in various implementations, the request obtaining module 450 includes instructions and/or logic 451a, and heuristics and metadata 451b.

In some implementations, the tunnel routing module 452 is configured to identify a plurality of candidate tunnel paths and select a candidate tunnel path according to congestion metrics, link metrics, and/or lengths of the plurality of candidate tunnel paths. To that end, in various implementations, the tunnel routing module 452 includes instructions and/or logic 453a, and heuristics and metadata 453b.

In some implementations, the tunnel instantiation module 454 is configured to instantiate (or signal) the tunnel path selected by tunnel routing module 452. In some implementations, the tunnel instantiation module 454 is also configured to cause the traffic to be routed according to the instantiated tunnel. To that end, in various implementations, the tunnel instantiation module 454 includes instructions and/or logic 455a, and heuristics and metadata 455b.

Although the request obtaining module 450, tunnel routing module 452, and the tunnel instantiation module 454 are illustrated as residing on a single device (i.e., the device 400), it should be understood that in other implementations, any combination of the request obtaining module 450, tunnel routing module 452, and the tunnel instantiation module 454 reside in separate computing devices. For example, each of the request obtaining module 450, tunnel routing module 452, and the tunnel instantiation module 454 reside on a separate device.

Moreover, FIG. 4 is intended more as functional description of the various features which be present in a particular embodiment as opposed to a structural schematic of the implementations described herein. As recognized by those of ordinary skill in the art, items shown separately could be combined and some items could be separated. For example, some functional modules shown separately in FIG. 4 could be implemented in a single module and the various functions of single functional blocks could be implemented by one or more functional blocks in various implementations. The actual number of modules and the division of particular functions and how features are allocated among them will vary from one embodiment to another and, in some implementations, depends in part on the particular combination of hardware, software, and/or firmware chosen for a particular embodiment.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first tunnel could be termed a second tunnel, and, similarly, a second tunnel could be termed a first tunnel, which changing the meaning of the description, so long as all occurrences of the "first tunnel" are renamed consistently and all occurrences of the "second tunnel" are renamed consistently. The first tunnel and the second tunnel are both tunnels, but they are not the same tunnel.

The terminology used herein is for the purpose of describing particular embodiments only and is not intended to be limiting of the claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method, comprising:
  obtaining a request to route traffic from a source to a destination in a network, wherein the request is associated with a threshold amount of bandwidth;
  identifying a plurality of candidate tunnel paths from the source to the destination;
  for each of the plurality of candidate tunnel paths, determining whether or not at least one of the candidate tunnel paths can provide the threshold amount of bandwidth; and
  in response to determining that none of the plurality of candidate tunnel paths can provide the threshold amount of bandwidth:

determining a congestion metric for each of the plurality of candidate tunnel paths from the source to the destination; and instantiating a tunnel from the source to the destination according to the candidate tunnel path with the lowest congestion metric.

2. The method of claim 1, wherein the congestion metric for a candidate tunnel path is a function of excess reserved bandwidth in relation to a reservable bandwidth threshold for one or more nodes in the candidate tunnel path.

3. The method of claim 1, further comprising:
when two or more candidate tunnel paths have a same lowest congestion metric:
determining a link metric for each of the two or more candidate tunnel paths; and
instantiating a tunnel from the source to the destination according to a respective candidate tunnel path of the two or more candidate tunnel paths with the lowest link metric.

4. The method of claim 1, further comprising:
in response to determining that one or more candidate tunnel paths can provide the threshold amount of bandwidth:
determining a link metric for each of the one or more candidate tunnel paths; and
instantiating a tunnel from the source to the destination according to a respective candidate tunnel path of the one or more candidate tunnel paths with the lowest link metric.

5. The method of claim 4, wherein a link metric for a candidate tunnel path is a function of link values characterizing links in the candidate tunnel paths.

6. The method of claim 1, further comprising:
routing the traffic from the source to the destination through the network according to the instantiated tunnel.

7. The method of claim 1, wherein the threshold amount of bandwidth corresponds to an estimated traffic value for a new tunnel.

8. The method of claim 1, wherein the threshold amount of bandwidth corresponds to a real-time traffic value for an existing tunnel.

9. A device, comprising:
one or more processors;
a non-transitory memory; and
one or more programs stored in the non-transitory, which, when executed by the one or more processors, cause the device to:
obtain a request to route traffic from a source to a destination in a network, wherein the request is associated with a threshold amount of bandwidth;
identify a plurality of candidate tunnel paths from the source to the destination;
for each of the plurality of candidate tunnel paths, determine whether or not at least one of the candidate tunnel paths can provide the threshold amount of bandwidth; and
in response to determining that none of the plurality of candidate tunnel paths can provide the threshold amount of bandwidth:
determine a congestion metric for each of the plurality of candidate tunnel paths from the source to the destination; and
instantiate a tunnel from the source to the destination according to the candidate tunnel path with the lowest congestion metric.

10. The device of claim 9, wherein the congestion metric for a candidate tunnel path is a function of excess reserved bandwidth in relation to a reservable bandwidth threshold for one or more nodes in the candidate tunnel path.

11. The device of claim 9, wherein the one or more programs further cause the device to:
when two or more candidate tunnel paths have a same lowest congestion metric:
determine a link metric for each of the two or more candidate tunnel paths; and
instantiate a tunnel from the source to the destination according to a respective candidate tunnel path of the two or more candidate tunnel paths with the lowest link metric.

12. The device of claim 9, wherein the one or more programs further cause the device to:
in response to determining that one or more candidate tunnel paths can provide the threshold amount of bandwidth:
determine a link metric for each of the one or more candidate tunnel paths; and
instantiate a tunnel from the source to the destination according to a respective candidate tunnel path of the one or more candidate tunnel paths with the lowest link metric.

13. The device of claim 9, wherein the one or more programs further cause the device to:
routing the traffic from the source to the destination through the network according to the instantiated tunnel.

14. The device of claim 9, wherein the threshold amount of bandwidth corresponds to an estimated traffic value for a new tunnel.

15. The device of claim 9, wherein the threshold amount of bandwidth corresponds to a real-time traffic value for an existing tunnel.

16. A non-transitory memory storing one or more programs, the one or more programs comprising instructions, which, when executed by one or more processors of a device, cause the device to:
obtain a request to route traffic from a source to a destination in a network, wherein the request is associated with a threshold amount of bandwidth;
identify a plurality of candidate tunnel paths from the source to the destination;
for each of the plurality of candidate tunnel paths, determine whether or not at least one of the candidate tunnel paths can provide the threshold amount of bandwidth; and
in response to determining that none of the plurality of candidate tunnel paths can provide the threshold amount of bandwidth:
determine a congestion metric for each of the plurality of candidate tunnel paths from the source to the destination; and
instantiate a tunnel from the source to the destination according to the candidate tunnel path with the lowest congestion metric.

17. The non-transitory memory of claim 16, wherein the congestion metric for a candidate tunnel path is a function of excess reserved bandwidth in relation to a reservable bandwidth threshold for one or more nodes in the candidate tunnel path.

18. The non-transitory memory of claim 16, wherein the instructions further cause the device to:
when two or more candidate tunnel paths have a same lowest congestion metric:

determine a link metric for each of the two or more candidate tunnel paths; and instantiate a tunnel from the source to the destination according to a respective candidate tunnel path of the two or more candidate tunnel paths with the lowest link metric.

19. The non-transitory memory of claim 16, wherein the instructions further cause the device to:

in response to determining that one or more candidate tunnel paths can provide the threshold amount of bandwidth:

determine a link metric for each of the one or more candidate tunnel paths; and instantiate a tunnel from the source to the destination according to a respective candidate tunnel path of the one or more candidate tunnel paths with the lowest link metric.

20. The non-transitory memory of claim 16, wherein the instructions further cause the device to:

routing the traffic from the source to the destination through the network according to the instantiated tunnel.

* * * * *